United States Patent
Ferris et al.

(10) Patent No.: US 9,436,459 B2
(45) Date of Patent: Sep. 6, 2016

(54) GENERATING CROSS-MAPPING OF VENDOR SOFTWARE IN A CLOUD COMPUTING ENVIRONMENT

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 843 days.

(21) Appl. No.: 12/790,527

(22) Filed: May 28, 2010

(65) Prior Publication Data

US 2011/0296370 A1 Dec. 1, 2011

(51) Int. Cl.
*G06F 9/44* (2006.01)
*G06F 9/445* (2006.01)

(52) U.S. Cl.
CPC ............. *G06F 8/71* (2013.01); *G06F 9/44536* (2013.01)

(58) Field of Classification Search
None
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0236820 A1* | 11/2004 | Flocken | 709/200 |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — Isaac T Tecklu
(74) *Attorney, Agent, or Firm* — Lowenstein Sandler LLP

(57) ABSTRACT

A compatibility service can determine the compatibility of different software programs provide by different vendors in a cloud. The compatibility service can identify the software programs provided by different vendors in the cloud and which of the identified software programs are compatible. The compatibility service can generate and store a record of the compatible software programs and provide identification, tracking, and mapping services based on the record.

21 Claims, 10 Drawing Sheets

(56) References Cited

U.S. PATENT DOCUMENTS

| | | |
|---|---|---|
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1* | 11/2009 | Ferris ............................... 718/1 |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0061250 A1* | 3/2010 | Nugent ......................... 370/242 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0055823 A1* | 3/2011 | Nichols et al. ............... 717/174 |
| 2011/0060832 A1* | 3/2011 | Govil et al. .................. 709/225 |
| 2011/0107327 A1* | 5/2011 | Barkie et al. ................ 717/176 |
| 2011/0131306 A1* | 6/2011 | Ferris et al. ................. 709/223 |
| 2011/0131335 A1 | 6/2011 | Spaltro et al. |
| 2011/0131384 A1* | 6/2011 | Henson ........................ 711/154 |
| 2011/0153727 A1* | 6/2011 | Li ................................. 709/203 |
| 2011/0161952 A1* | 6/2011 | Poddar et al. ................ 717/173 |
| 2011/0270963 A1* | 11/2011 | Saito et al. ................... 709/224 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

(56) References Cited

OTHER PUBLICATIONS

Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

* cited by examiner

| SOFTWARE PROGRAM ⎫410 | TYPE ⎫415 | VENDOR ⎫420 | COMPATIBILITY ⎫425 | MINIMUM CLOUD RESOURCES REQUIRED ⎫430 | PRICE ⎫435 | |
|---|---|---|---|---|---|---|
| SOFTWARE "1" | OPERATING SYSTEM | VENDOR "A" | SOFTWARE "3" SOFTWARE "4" | PROCESSING: "$w_1$" MEMORY: "$x_1$" BANDWIDTH: "$y_1$" STORAGE: "$z_1$" | $500.00 PER INSTANCE | ⋯ |
| SOFTWARE "2" | OPERATING SYSTEM | VENDOR "B" | SOFTWARE "4" SOFTWARE "5" | PROCESSING: "$w_2$" MEMORY: "$x_2$" BANDWIDTH: "$y_2$" STORAGE: "$z_2$" | $600.00 PER INSTANCE | ⋯ |
| SOFTWARE "3" | EMAIL SERVER | VENDOR "A" | SOFTWARE "1" SOFTWARE "4" | PROCESSING: "$w_3$" MEMORY: "$x_3$" BANDWIDTH: "$y_3$" STORAGE: "$z_3$" | $1.00 PER USER | ⋯ |
| SOFTWARE "4" | APPLICATION SERVER | VENDOR "C" | SOFTWARE "1" SOFTWARE "2" SOFTWARE "3" SOFTWARE "5" | PROCESSING: "$w_4$" MEMORY: "$x_4$" BANDWIDTH: "$y_4$" STORAGE: "$z_4$" | $1,000 PER INSTANCE | ⋯ |
| SOFTWARE "5" | WEB SERVER | VENDOR "B" | SOFTWARE "2" SOFTWARE "4" | PROCESSING: "$w_5$" MEMORY: "$x_5$" BANDWIDTH: "$y_5$" STORAGE: "$z_5$" | $.50 PER SIMULTANEOUS USER | ⋯ |

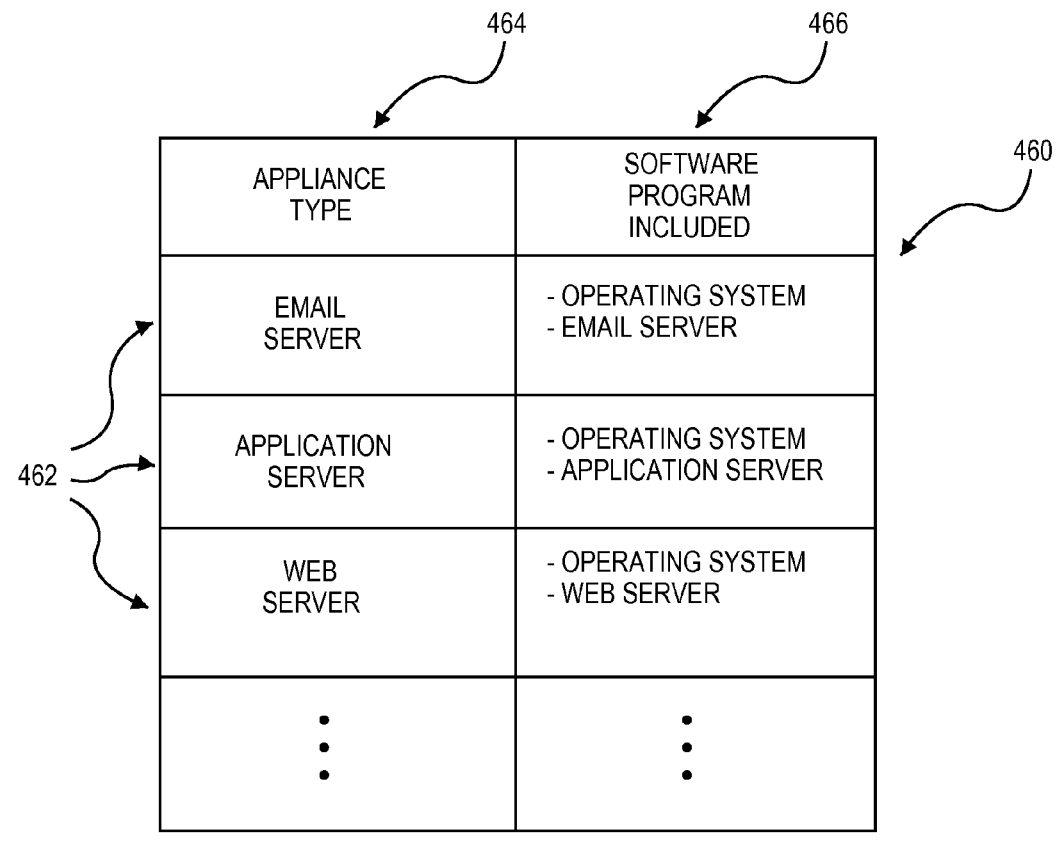

| APPLIANCE TYPE | SOFTWARE PROGRAM INCLUDED |
|---|---|
| EMAIL SERVER | - OPERATING SYSTEM<br>- EMAIL SERVER |
| APPLICATION SERVER | - OPERATING SYSTEM<br>- APPLICATION SERVER |
| WEB SERVER | - OPERATING SYSTEM<br>- WEB SERVER |
| ⋮ | ⋮ |

FIG. 4C

GENERATING CROSS-MAPPING OF VENDOR SOFTWARE IN A CLOUD COMPUTING ENVIRONMENT

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, the cloud also provides software programs from different software vendors that the user can buy, lease, or utilize under a software as a service model (SaaS). When considering the software programs, the user can assume that the software programs from a single software vendor will be compatible. The user, however, cannot make this assumption when considering software programs from different software vendors. Thus, the user is discouraged from utilizing software programs from different software vendors, in combination, due to possible incompatibilities.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4A illustrates an example of a compatibility record, according to various embodiments;

FIG. 4C illustrates an example of an appliance record, according to various embodiments;

DETAILED DESCRIPTION OF EMBODIMENTS

Figure 1:
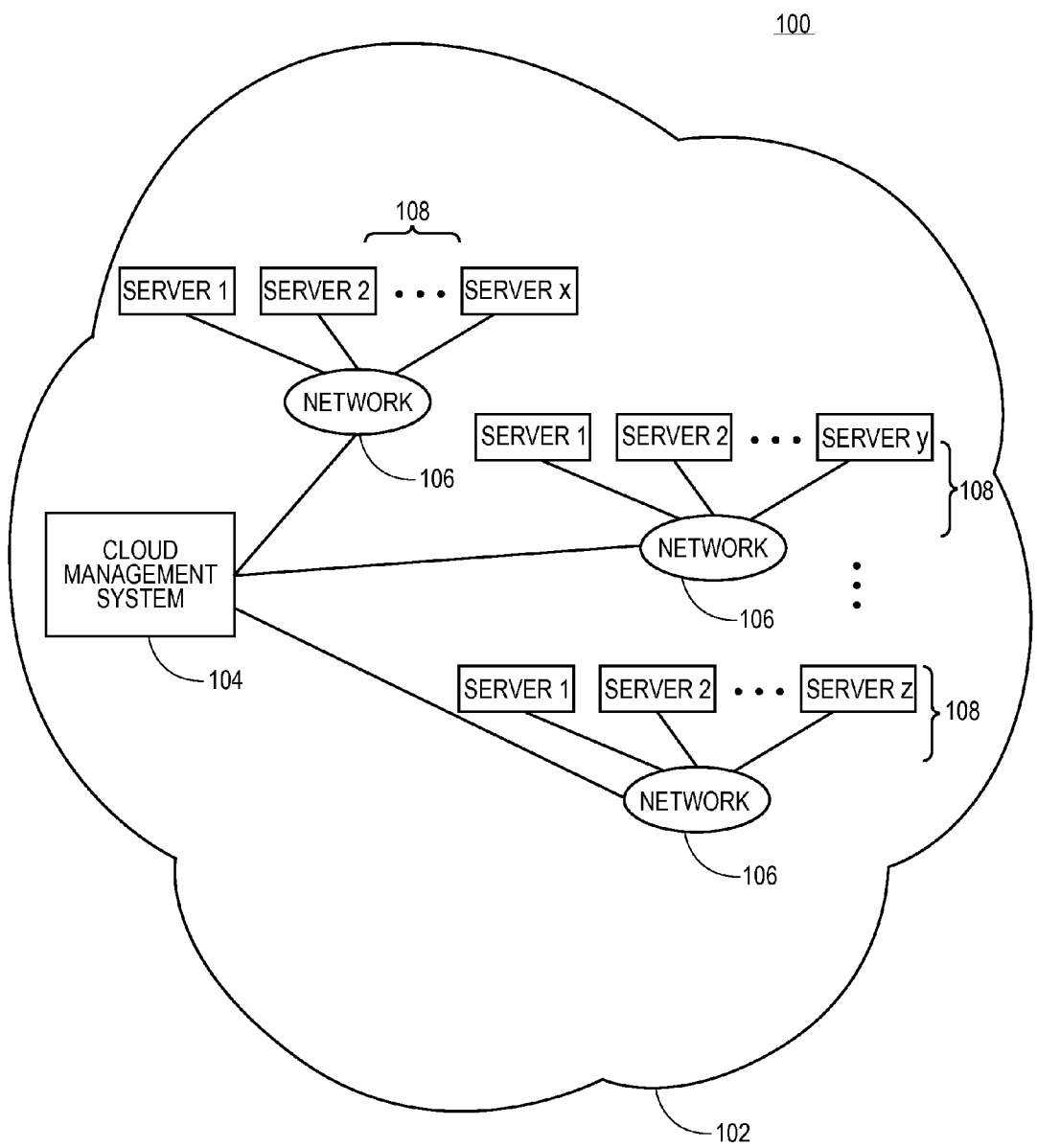
FIG. 1 illustrates an example of a cloud computing environment in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for enabling users to identify compatible software programs provided by different vendors in a cloud computing environment. Additionally, embodiments of the present teachings relate to systems and method for enabling users to design software appliances based on compatible software programs provided by different vendors in a cloud computing environment.

According to embodiments, a compatibility service can be configured to determine the compatibility of different software programs provide by different vendors in a cloud. The compatibility service can be configured to identify the software programs provided by different vendors in the cloud and which of the identified software programs are compatible. The compatibility service can determine which of the software programs are compatible by querying the different vendors. Likewise, the compatibility service can determine which of the software programs are compatible by querying a cloud management system of the cloud to identify which of the software programs are currently used together in the cloud.

According to embodiments, once the compatible software programs are determined, the compatibility service can be configured to generate and store a record of the compatible software programs. For a particular software program, the record can include an identification of a particular software program (e.g. name, version), a type of particular software program (operating system, application server, etc.), the vendor of the particular software program, and other software programs provided in the cloud that are compatible the particular software program. For a particular software program, the record can also store other information such as a minimum amount of cloud resources to instantiate the particular software program in the cloud and a price to use the particular software program in the cloud.

According to embodiments, once the record is generated, the compatibility service can be configured to utilize the record to identify, for a user, compatible software programs provided by the cloud. Likewise, the compatibility service can be configured to utilize the record to assist users designing and implementing software appliances in the cloud. The compatibility service can be configured to offer these services to the user at a fee.

By identifying, tracking, and mapping compatible software program provided by the cloud, the compatibility service can enable users to easily identify compatible software programs across different vendors. Accordingly, the compatibility service allows the user flexibility in using the cloud by allowing the user to customize software program usage across different vendors.

FIG. 1 illustrates an overall cloud computing environment 100 in which software from different vendors can be provided in a cloud, and systems and methods for identifying compatible software, provided by the different vendors, in the cloud, according to embodiments of the present teachings. As used herein, a "cloud" can comprise a collection of resources that can be invoked to instantiate a virtual machine, software appliance or other process for a limited or defined duration. As shown for example in FIG. 1, the collection of resources supporting a cloud 102 can comprise resource servers 108 configured to deliver computing components needed to instantiate a virtual machine, software appliance, or other process. For example, one group of the resource servers 108 can host and serve an operating system or components thereof to deliver to and instantiate a virtual machine. Another group of the resource servers 108 can accept requests to host computing cycles or processor time, to supply a defined level of processing power for a virtual machine. A further group of the resource servers 108 can host and serve applications to load on an instantiation of a virtual machine, such as an email client, a browser application, a messaging application, or other applications or software. Other types of resource servers are possible.

In embodiments, the entire set of the resource servers 108 or other hardware or software resources used to support the cloud 102 along with its instantiated virtual machines, software appliances, or other processes can be managed by a cloud management system 104. The cloud management system 104 can comprise a dedicated or centralized server and/or other software, hardware, and network tools that communicate via one or more networks 106 such as the Internet or other public or private network with all of the resource servers 108 to manage the cloud 102 and its operation. To instantiate a new virtual machines, software appliances, or other processes, a user can transmit an instantiation request to the cloud management system. 104 for the particular type of virtual machine, software appliance, or other process they wish to invoke for their intended application. A user can for instance make a request to instantiate a set of virtual machines configured for email, messaging or other applications from the cloud 102. The request can be received and processed by the cloud management system 104, which identifies the type of virtual machine, software appliance, or other process being requested. The cloud management system 104 can then identify the collection of resources necessary to instantiate that virtual machine, software appliance, or other process. In embodiments, the instantiated virtual machines, software appliances, or other processes can, for example, comprise virtual transaction servers used to support Web storefronts, or other transaction sites.

In embodiments, the user's instantiation request can specify a variety of parameters defining the operation of the virtual machines, software appliances, or other processes to be invoked. The instantiation request, for example, can specify a defined period of time for which the instantiated virtual machine, software appliance, or other process is needed. The period of time can be, for example, an hour, a day, or other increment of time. In embodiments, the user's instantiation request can specify the instantiation of the virtual machines, software appliances, or other processes on a task basis, rather than for a predetermined amount of time. For instance, a user could request resources until a software update is completed. The user's instantiation request can specify other parameters that define the configuration and operation of the virtual machines, software appliances, or other processes. For example, the request can specify an amount of processing power or input/output (I/O) throughput the user wishes to be available to each instance of the virtual machines, software appliances, or other processes. In embodiments, the requesting user can for instance specify a service level agreement (SLA) acceptable for the virtual machines, software appliances, or other processes. Other parameters and settings can be used. One skilled in the art will realize that the user's request can likewise include combinations of the foregoing exemplary parameters, and others.

When the request to instantiate a virtual machines, software appliances, or other processes has been received and the necessary resources to build the virtual machines, software appliances, or other processes have been identified, the cloud management system 104 can communicate with one or more the resource servers 108 to locate resources to supply the virtual machines, software appliances, or other processes. The cloud management system 104 can select resources from any of the resource servers 108 to assemble the resources needed to build the requested virtual machines, software appliances, or other processes. It may be noted that in some embodiments, permanent storage such as hard disk arrays may not be included or located within the resource servers 108 available to the cloud management system 104, because the virtual machines, software appliances, or other processes may be intended to operate on a purely transient or temporary basis. In embodiments, other hardware resources, software resources, or other resources not strictly located or hosted in the cloud can be leveraged as needed. For example, other software services that are provided outside of the cloud 102 and hosted by third parties can be invoked by in-cloud virtual machines, software appliances, or other processes. For further example, other non-cloud hardware and/or storage services can be utilized as an extension to the cloud 102, either on-demand, subscribed, or decided basis.

With the resource requirements identified, the cloud management system 104 can extract and build the virtual machines, software appliances, or other processes on a dynamic or on-demand basis. For example, a group of the resource servers 108 can respond to an instantiation request for a given quantity of processor cycles with an offer to deliver that computational power immediately and guaranteed for the next hour. A further group of the resource servers 108 can offer to immediately supply communication bandwidth, for example on a guaranteed minimum or best-efforts basis. In other embodiments, the virtual machines, software appliances, or other processes can be built on a batch basis or at a particular future time. For example, a group of the resource servers 108 can respond to a request for instantiation at a programmed time with an offer to deliver the specified quantity of processor cycles within a specific amount of time, such as the next 12 hours.

The cloud management system 104 can select a group of the resource servers 108 that match or best match the instantiation request for resources needed to build the virtual machines, software appliances, or other processes. The cloud management system 104 can then coordinate the integration of the group of the resource servers 108, to build and launch the requested virtual machines, software appliances, or other processes. The cloud management system 104 can track the integrated group of the resource servers 108, or other distributed resources that are dynamically or temporarily combined, to produce and manage the requested virtual machines, software appliances, or other processes.

In embodiments, the cloud management system 104 can generate a resource aggregation table that identifies the group of the resource servers 108 that will be used to supply the resources for the virtual machines, software appliances, or other processes. The resource servers 108 can be identified by unique identifiers such as, for instance, Internet Protocol (IP) addresses or other addresses. The cloud management system 104 can register the group of the resource servers 108 contributing to the virtual machines, software appliances, or other processes.

The cloud management system 104 can then set up and launch the initiation process for the virtual machines, software appliances, or other processes to be delivered from the cloud 102. The cloud management system 104 can for instance transmit an instantiation command or instruction to the group of the resource servers 108 providing resources to the virtual machines, software appliances, or other processes. The cloud management system 104 can receive a confirmation message back from each server in the group of the resource servers 108 indicating a status regarding the provisioning of their respective resources. Each of the resource servers 108 can confirm, for example, the availability of a dedicated amount of processor cycles, amounts of electronic memory, communications bandwidth, or applications or other software prepared to be served.

Figure 2:
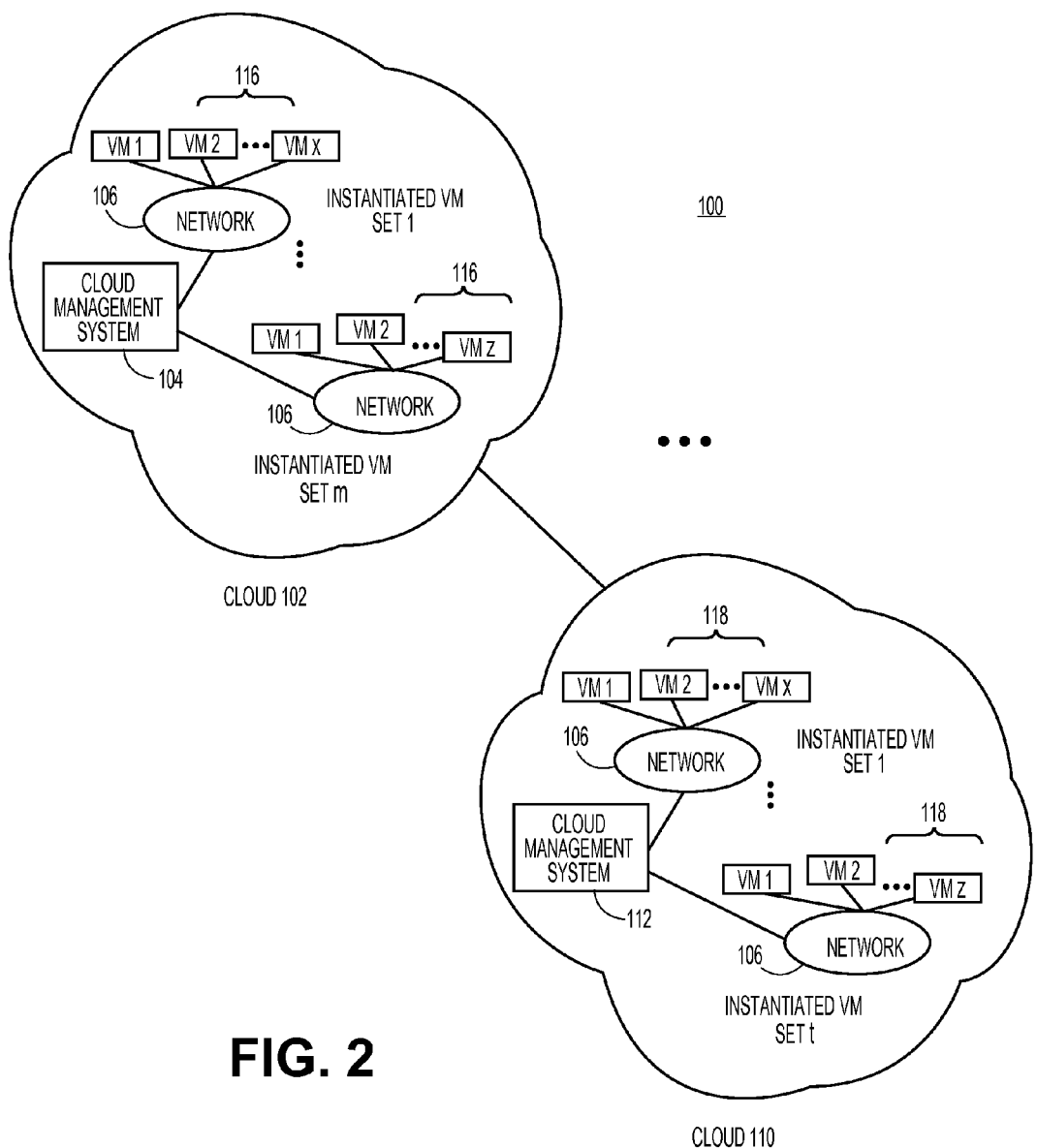
FIG. 2 illustrates another example of the cloud computing environment in which various embodiments of the present teachings can be practiced in another regard including multiple cloud arrangements, according to various embodiments.

As shown for example in FIG. 2, the cloud management system 104 can then instantiate one or more than one set of virtual machines 116, software appliances (not shown), or other processes (not shown) on the resources supplied by the group of the resource servers 108. In embodiments, the cloud management system 104 can instantiate a given number, for example, 10, 500, 1000, or other number of virtual machines, software appliances, or other processes to be made available to users on a network 106, such as the Internet or other public or private network. Each virtual machine, software appliance, or other process can be assigned an instantiated machine ID that can be stored in the resource aggregation table, or other record or image of the instantiated virtual machines, software appliances, or other processes. Additionally, the cloud management system 104 can store the duration of each virtual machine, software appliance, or other process, and the collection of resources utilized by the complete set of virtual machines, software appliances, or other processes, for example as illustrated, the instantiated virtual machines 116.

In embodiments, the cloud management system 104 can further store, track and manage a user's identity and associated set of rights or entitlements to software, hardware, and other resources provided by the cloud 102. Each user that populates virtual machines, software appliances, or other processes in the cloud 102 can have specific rights and resources assigned and made available to them. The cloud management system 104 can track and configure specific actions that a user can perform, such as provision virtual machines, software appliances, or other processes with resources, configure virtual machines, software appliances, or other processes to desired specifications, submit jobs to virtual machines, software appliances, or other processes, manage other users of virtual machines, software appliances, or other processes, and other privileges or actions. The cloud management system 104 can further generate records of the usage of virtual machines, software appliances, or other processes, for example virtual machines 116, to permit tracking, billing, and auditing of the resources consumed by the user. In embodiments, the cloud management system 104 can, for example, meter the usage and/or duration of the instantiated virtual machines 116, to generate subscription billing records for a user that has requested resources for those machines. Other billing or value arrangements are possible.

The cloud management system 104 can configure each virtual machine, software appliance, or other process to be made available to users of the one or more networks 106 via a browser interface, or other interface or mechanism. Each virtual machine, software appliance, or other process can communicate with the cloud management system 104 and the resource servers 108 supporting virtual machines, software appliances, or other processes via a standard Web application programming interface (API), or via other calls or interfaces. The virtual machines, software appliances, or other processes, for example instantiated virtual machines 116, can likewise communicate with each other, as well as other sites, servers, locations, and resources available via the Internet or other public or private networks, whether within a given cloud 102 or between clouds.

It may be noted that while a browser interface or other front-end can be used to view and operate virtual machines, software appliances, or other processes, for example the virtual machines 116, from a client or terminal, the browser interface or other front-end required to view the virtual machines, software appliances, or other processes can be hosted remotely in the cloud 102. In embodiments, the virtual machines, software appliances, or other processes, for example, the virtual machines 116 or other resources may not depend on or require the user's own on-premise hardware or other resources. In embodiments, a user can therefore request and instantiate virtual machines, software appliances, or other processes on a purely off-premise basis, for instance to build and launch a virtual storefront or other application.

Because the cloud management system 104 in one regard specifies, builds, operates and manages the virtual machines, software appliances, or other processes, for example, the virtual machines 116 on a logical level, the user can request and instantiate virtual machines, software appliances, or other processes on a real-time or near real-time basis, without a need to specify or install any particular hardware. The user's virtual machines, software appliances, or other processes, such as the instantiated virtual machines 116, can be scaled up or down immediately or virtually immediately on an on-demand basis, if desired. In embodiments, the resource server 108 that are accessed by the cloud management system 104 to support the virtual machines, software appliances, or other processes can change or be substituted, over time. The type and operating characteristics of the virtual machines, software appliances, or other processes, for example the instantiated virtual machines 116, can nevertheless remain constant or virtually constant, since instances are assembled from abstracted resources that can be selected and maintained from diverse sources based on uniform specifications.

In teens of network management of the virtual machines, software appliances, or other processes, such as the instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate the software and hardware resources on individual resource servers 108 or the virtual machines, software appliances, or other processes, themselves. The cloud management system 104 can monitor the virtual machines, software appliances, or other processes to detect any virus or other rogue process on individual virtual machine, software appliance, or other process, and for instance terminate the infected virtual machine, software appliance, or other process. The cloud management system 104 can likewise manage the virtual machines, software appliances, or other processes, for example, the instantiated virtual machines 116 on a collective basis, for instance, to push or deliver a software upgrade to all virtual machines, software appliances, or other processes. Other management processes are possible.

In embodiments, more than one set of virtual machines, software appliances, or other processes can be instantiated in a given cloud at the same, overlapping or successive times. The cloud management system 104 can, in such implementations, build, launch and manage multiple sets of virtual machines, software appliances, or other processes based on the same or different underlying resource servers 108, such as may be requested by different users. The cloud management system 104 can institute and enforce security protocols in a cloud 102 hosting multiple sets of virtual machines, software appliances, or other processes. Each of the individual sets of virtual machines, software appliances, or other processes can be hosted in a respective partition or sub-cloud of the resources of the cloud 102. The cloud management system 104 of the cloud 102 can for example deploy services specific to isolated or defined sub-clouds, or isolate individual virtual machines, software appliances, or other processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud 102 as a common utility while retaining the assurance that their information is secure from other users of the cloud 102. In further embodiments, the sub-clouds can nevertheless be configured to share resources, if desired.

In embodiments, the virtual machines, software appliances, or other processes generated in the cloud 102 can also interact with the virtual machines, software appliances, or other processes generated in a second cloud 110. For example, as illustrated in FIG. 2, the instantiated virtual machines 116 can also interact with virtual machines 118 of the cloud 110. The cloud management system 104 of the cloud 102 can interface with the cloud management system 112 of the cloud 110, to coordinate those domains and operate the clouds and/or can also interact with on a combined basis. The cloud management system 104 of the cloud 102 can track and manage virtual machines, software appliances, or other processes instantiated in the cloud 102, as well as virtual machines, software appliances, or other processes in the cloud 110. Additionally, when instantiate the virtual machines, software appliances, or other processes, a portion of the virtual machines, software appliances, or other processes can be instantiated in the cloud 102 and a portion of the virtual machines, software appliances, or other processes can be instantiated in the cloud 110.

In the foregoing and other embodiments, the user making an instantiation request or otherwise accessing or utilizing the cloud 102 or 110 can be a person, customer, subscriber, administrator, corporation, organization, or other entity. In embodiments, the user can be or include another virtual machines, software appliances, or other processes. In further embodiments, multiple users or entities can share the use of virtual machines, software appliances, or other processes.

Figure 3:
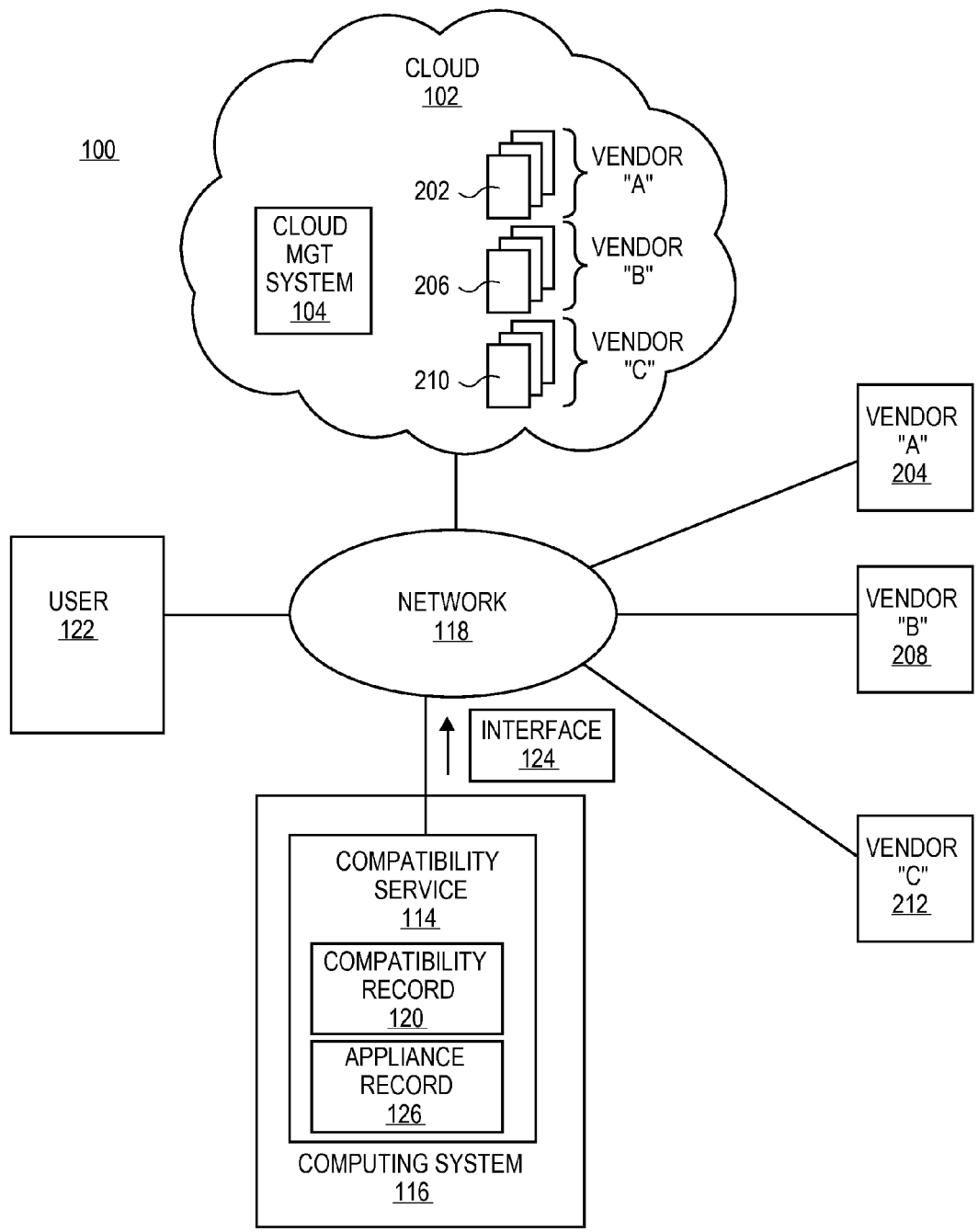
FIG. 3 illustrates another example of the cloud computing environment in which a compatibility service can identify, track, and map compatible software programs provided by the cloud from different vendors, according to various embodiments.

FIG. 3 illustrates an example of the cloud computing environment 100 in which compatible software programs provided by different vendors in the cloud 102 can be identified and mapped. While FIG. 3 illustrates various components of the cloud computing environment 100, one skilled in the art will realize that components can be added or removed.

As illustrated in FIG. 3, the cloud computing environment 100 can include the cloud 102. The cloud 102 can include the hardware and software resources to support virtual machines, software appliances, or other processes, as described above, including the cloud management system 104. The cloud 102 can be any type of cloud that is controlled by any type of entity. For example, the cloud 102 can be a public cloud that is owned and/or operated by a public cloud vendor, such as Amazon™, Inc., in order to provide the services of the cloud to subscribers and customers.

In embodiments, the cloud 102 can offer software programs of different vendors for use by the subscribers and customers of the cloud 102. For example, the subscriber and customers can buy, lease, or utilize, under a software as a service model (SaaS), the software programs. The software programs can include any type of software such as operating systems, such as a distribution of Linux provided by Red Hat™ Corporation, and various software programs requested or typically desired by subscribers, such as middleware applications, web hosting applications, electronic mail (email) applications, and the like. The software programs can include software programs provided by different vendors, for example Red Hat™ Corporation, Oracle®, and the like. The software programs can include any type of product and/or service provided by a vendor in the cloud 102. For example, the software programs can include operating systems and/or updates to these, application programs and/or updates to these, software appliances and/or updates to these, and any combinations of operating systems, application programs and/or software appliances. The software programs can also include services provided by the vendor, for example, application services, data storage, identity management, security, communications, technical support, and/or other services. The vendors can offer the software programs in the cloud 102 under a variety of different schemes, such as offer for purchase, offer for lease, and/or offer for "on-demand" use under a subscription, for example, a Software as a Service (SaaS) model. As illustrated, for example, the cloud 102 can provide software programs 202 provided by vendor "A" 204, software programs 206 provided by vendor "B" 208, and software programs 210 provided by vendor "C" 212.

A subscriber or customer can desire to use one or more of the software programs 202, 206, and 210 from the different vendors together in the cloud 102. For example, the subscriber or customer can desire to use one of the software programs 202 provided by the vendor "A" 204 together with one of the software programs 210 provided by the vendor "C" 212. Likewise, for example, the subscriber or customer can desire to use one of the software programs 206 provided by vendor "B" 208 and can desire to know other software programs that are compatible with this software program.

In embodiments, the cloud computing environment 100 can include a compatibility service 114. The compatibility service 114 can be configured to identify, track, and map the compatibility of the software programs 202, 206, and 210 from the vendor "A" 204, the vendor "B" 208, and the vendor "C" 212. Additionally, the compatibility service 114 can be configured to provide compatibility mapping services to entities of the cloud computing environment 100, as described below.

In embodiments, the compatibility service 114 can be implemented as a software program that is configured to perform the compatibility identification, tracking, and mapping services as described herein. Likewise, the compatibility service 114 can be implemented as a portion of other software programs. In either case, the compatibility service 114 can be configured to include the necessary logic, commands, instructions, and protocols to perform the processes described herein. In any implementation, the compatibility service 114 can be written in any type of conventional programming language such as C, C++, JAVA, Perl, and the like.

In embodiments, as illustrated in FIG. 3, the compatibility service 114 can be executed on a computing system 116. The computing system 116 can be one more of any type of computing system capable of executing the compatibility service 114, such as servers, laptops, desktops, and the like. The computing system 116 can include a number of hardware resources, which are used to execute the compatibility service 114, such as processors, memory, network hardware and bandwidth, storage devices, etc. and a number of software resources, such as operating systems, application programs, software appliances, etc. The compatibility service 114 can be stored in computer readable storage devices or media (CD, DVD, hard drive, portable storage memory, etc.) whether local to the computing system 116 or remotely located.

The computing system 116 can be coupled to one or more networks 118. The compatibility service 114 can be configured to utilize the one or more networks 118 to communicate with the cloud 102 and the vendor "A" 204, vendor "B" 208, and vendor "C" 212. The one or more networks 118 can be or include the Internet, or other public or private networks. The one or more or more networks 118 can be or include wired, wireless, optical, and other network connections. One skilled in the art will realize that the one or more networks 118 can be any type of network, utilizing any type of communication protocol, to connect the computing systems.

While FIG. 3 illustrates the compatibility service 114 being executed on the computing system 116, the compatibility service 114 can be executed on any computing system in the cloud computing environment 100. For example, the compatibility service 114 can be executed in the cloud 102. Likewise, the compatibility service 114 can be executed on computing systems of the vendor "A" 204, vendor "B" 208, and vendor "C" 212.

In embodiments, to identify and track the compatibility of the software programs 202, 206, and 210, the compatibility service 114 can be configured to identify the software programs 202, 206, and 210 provided by the vendor "A" 204, vendor "B" 208, and vendor "C" in the cloud 102. In particular, the compatibility service 114 can be configured to communicate with the cloud management system 104, the vendor "A" 204, the vendor "B" 208, and/or the vendor "C" 212 to determine the software programs 202, 206, and 208 provided in the cloud 102. To achieve this, the compatibility service 114 can be configured to include the necessary logic, commands, instructions, and protocols to communicate with the cloud management system 104, the vendor "A" 204, the vendor "B" 208, and/or the vendor "C" 212 via the one or more networks 118.

When identifying the software programs 202, 206, and 210, the compatibility service 114 can be configured to identify and collect any information relevant to the software programs 202, 206, and 210. For example, the compatibility service 114 can identify and collect information such as an identification of each software program (e.g. name and version), a type of each software program (e.g. OS, email server, application server, word processing program, etc.), the vendor that provides each software program, a minimum amount of resources to instantiate each software program in the cloud 102, and a price the vendor changes to provide each software program in the cloud 102. Any portion of this information can be maintained and provided to the compatibility service 114 by the cloud management system 104, the vendor "A" 204, the vendor "B" 208, and/or the vendor "C" 212.

During identifying the software programs 202, 206, and 210 or at a different time, the compatibility service 114 can also be configured to identify which of the software programs 202, 206, and 210 are compatible with each other. In embodiments, compatible software programs are software programs that can operate together, can share data, can communicate, and/or can otherwise function together to perform a task. The compatibility service 114 can be configured to communicate with the cloud management system 104, the vendor "A" 204, the vendor "B" 208, and/or the vendor "C" 212 to determine the compatibility of the software programs 202, 206, and 210. For example, the cloud management system 104 maintains a record of all software currently instantiated in the cloud 102. Thus, the cloud management system 104 can maintain a record of the software programs 202, 206, and 210 that are currently operating properly together, i.e. are compatible. Likewise, the vendor "A" 204, the vendor "B" 208, and/or the vendor "C" 212 can maintain records of software programs known to be compatible with their software programs. When requested by the compatibility service 114, the cloud management system 104, the vendor "A" 204, the vendor "B" 208, and/or the vendor "C" 212 can provide the compatibility of the software programs 202, 206, and 210, know by each.

Once the compatibility service 114 has identified the software programs 202, 206, and 210 and which of these are compatible, the compatibility service 114 can be configured to generate a compatibility record 120 that details the software programs 202, 206, and 210 and the compatibility of these software programs. The compatibility record 120 can be any type of searchable data record system (e.g. database) that is capable of storing information about the software programs 202, 206, and 210 and the compatibility of these. To generate and utilize the compatibility record 120, the compatibility service 114 can be configured to include the necessary logic, commands, instructions, and protocols to generate the compatibility record 120, store data in the compatibility record 120, search the compatibility record 120, and extract data from the compatibility record 120. The compatibility service 114 can be configured to store the compatibility record 120 in computer readable storage devices or media (CD, DVD, hard drive, portable storage memory, etc.) whether local to the computing system 116 or remotely located.

FIG. 4A is an example of the compatibility record 120. As illustrated, the compatibility record 120 can include a table 400 with a number of rows 405. Each row 405 can store the information related to a software program. The rows 405 have associated columns 410, 415, 420, 425, 430, and 435 for storing information related to the software programs. The information can include column 410—an identification of each software program (e.g. name and version), column 415—a type of each software program (e.g. OS, email server, application server, word processing program, etc.), column 420—the vendor that provides each software program, column 425—the software programs that are compatible, column 430—a minimum amount of resources to instantiate each software program in the cloud 102, and column 435—a price the vendor changes to provide each software program in the cloud 102. One skilled in the art will realize that FIG. 4A illustrates an example of the compatibility record 120 and that the compatibility record 120 can be arranged in any format to store the information about the software programs 202, 206, and 210.

In embodiments, once the compatibility service has generated and stored the compatibility record 120, the compatibility service 114 can be configured to update the compatibility record 120 as new software programs are provided from the cloud 102, as one or more of the software programs 202, 206, and 210 are no longer provided by the cloud 102, and/or as the information related to the software programs 202, 206, and 210 changes. The compatibility service 114 can periodically communicate with the cloud management system 104, the vendor "A" 204, the vendor "B" 208, and/or the vendor "C" 212 to identify any changes that require an update to the compatibility record 120. Likewise, the compatibility service 114 can receive notification from the cloud management system 104, the vendor "A" 204, the vendor "B" 208, and/or the vendor "C" 212 of a change that requires an update to the compatibility record 120.

In embodiments, once the compatibility record 120 is generated, the compatibility service 114 can be configured to provide compatibility tracking and mapping services to entities in the cloud computing environment 100. The compatibility service 114 can provide the compatibility tracking and mapping services to the cloud management system 104, the vendor "A" 204, the vendor "B" 208, and/or the vendor "C" 212. Likewise, the compatibility service 114 can provide the compatibility tracking and mapping services to a user 122, for example, a subscriber or customer of the cloud 102. The compatibility service 114 can be configured to provide the compatibility tracking and mapping services to entities in the cloud computing environment 100 for a fee.

In embodiments, the compatibility tracking and mapping services, provided by the compatibility service 114, can include identifying compatible software programs and information about the software programs. To provide these services, the compatibility service 114 can be configured to provide an interface 124 that allows an entity in the cloud computing environment 100 to request identification of compatible software programs and information about the software programs. The compatibility service 114 can be configured to include the necessary logic, commands, instructions, and protocols to generate the interface 124 (e.g. command line interfaces and/or graphical user interfaces (GUIs)) that is accessible via the one or more networks 118. For instance, the compatibility tool 114 can generate a web based interface that allows an entity of the cloud computing environment 100 to provide a request and receive a response. The request, from the entity, can specify, for example, the software program for which to determine compatibility and the information desired by the entity.

In embodiments, when a request to identify compatible software programs or information about the software programs is received, the compatibility service 114 can be configured to search the compatible record 120 in order to determine any compatible software programs and information about the software programs based on the request. Once determined, the compatibility service 114 can provide a response including the compatible software programs and any relevant information via the interface 124.

Figure 4B:
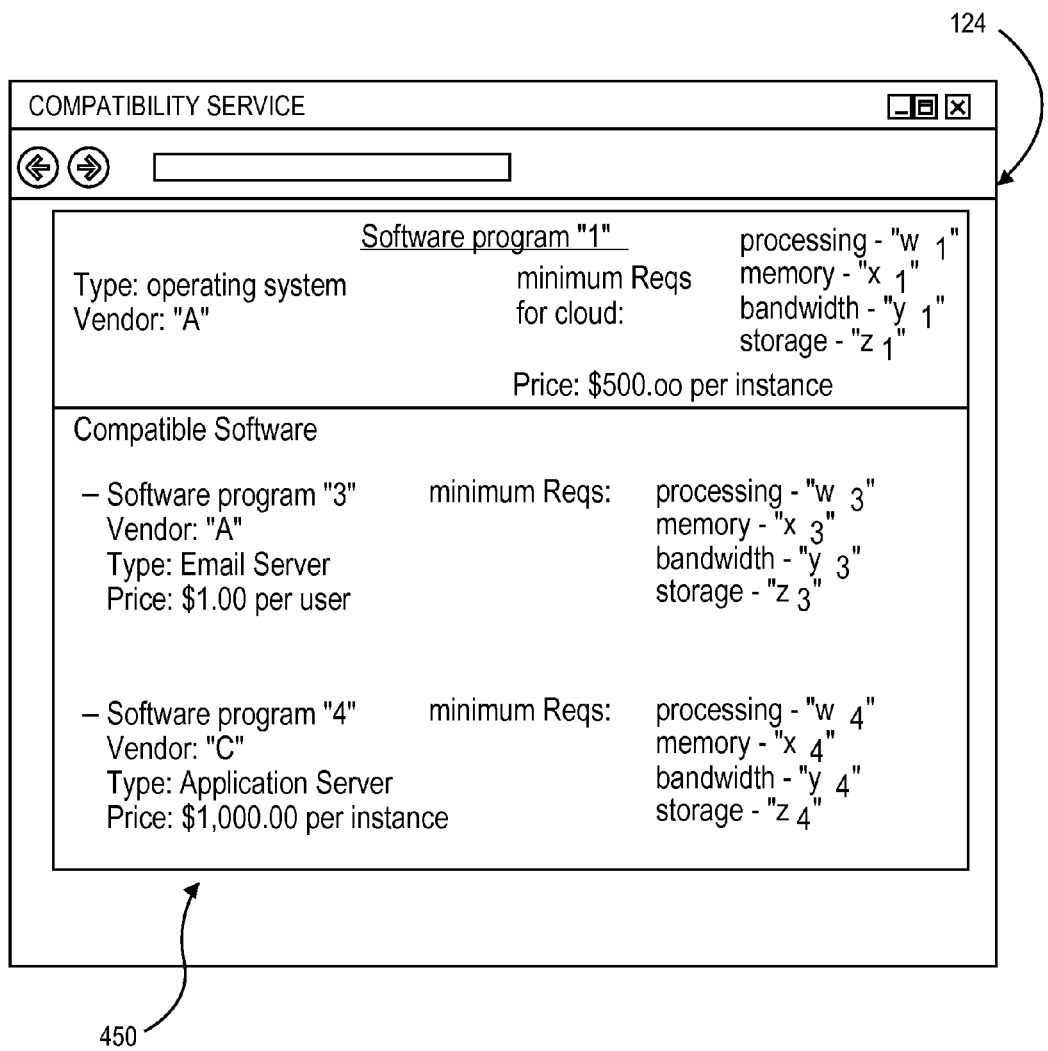
FIG. 4B illustrates an example of a response identifying compatible software programs, according to various embodiments.

For example, referring to the example of the compatibility record 120 illustrated in FIG. 4A, the user 122 can desire to utilize software program "1" of the software programs 202 provided by the vendor "A" 204 in the cloud 102. The user 122 can also desire to identify any other software programs that are compatible with the software program "1" of the software programs 202. The user 122 can provide a request, via the interface 124, to identify all compatible software programs which are compatible with the software program "1" of the software programs 202. When received, the compatibility service 114 can search the compatibility record 120 to determine the software programs that are compatible with the software program "1", i.e. software program "3" provided by vendor "A" 204 and software program "4" provided by vendor "C" 212. The compatibility service 114 can also extract any information related to the software program "1", software program "3", and software program "4". Then, the compatibility service can provide the determined compatibility and information to the user 122 via the interface 124. FIG. 4B illustrates an example of the response 450 provided to the user 122, via the interface 124.

In embodiments, the compatibility service 114 can also be configured to utilize the compatibility record 120 to provide other services to entities in the cloud computing environment 100. The compatibility service 114 can be configured to design software appliances for the entities of the cloud computing environment 100. The compatibility service 114 can be configured to maintain an appliance record 126. The appliance record 126 can include various types of known software appliances (e.g. email server appliance, application server appliance, web server appliance, etc.) and the software programs that are included in the various types of known software appliances. The compatibility service 114 can be configured to store the appliance record 126 in a computer readable storage devices or media (CD, DVD, hard drive, portable storage memory, etc.) whether local to the computing system 116 or remotely located.

FIG. 4C illustrates an example of the appliance record 126, according to various embodiments. As illustrated, the appliance record 126 can be configured as a table 460 with a number of rows 462. Each row 462 can store the information related to a particular type of software appliance (e.g. email server appliance, application server appliance, web server appliance, etc.). The rows 462 have associated columns 464 and 466 for storing information related to the known software appliances. The information can include column 464—an identification of a type of known software appliance and column 466—types of software programs (e.g. OS, email server, application server, etc.) included in the types of known software appliances. One skilled in the art will realize that FIG. 4C illustrates an example of the appliance record 126 and that the appliance record 126 can be arranged in any format to store the information about known software appliances.

In embodiments, the entities of the cloud computing environment 100 can request, via the network 118, that the compatibility service 114 design a software appliance, such as an email server appliance, web server appliance, application server appliance and the like. The request, from the entities, can include a type of software appliance for the compatibility service 114 to design. In response, the compatibility service 114 can be configured to determine one or more designs for the type of the software appliance requested. The compatibility service 114 can be configured to search the appliance record 126 to determine the types of software programs that are included in the type of software appliance requested. Once the types of software programs are determined, the compatibility service 114 can be configured to search the compatibility record 120 to determine various combinations of software programs that meet the determined types of software programs and that are compatible. The combination of software programs can include any number of software programs that meet the type of the software appliance requested.

The compatibility service 114 can be configured to provide the determined combinations of software programs to the requesting entity as various designs of the requested software appliance. Additionally, the compatibility service 114 can be configured to provide other information contained in the compatibility record 120 about the combinations of software programs (e.g. vendor, price, and minimum cloud resource requirements).

In embodiments, the compatibility service 114 can also be configured to generate a specification for the software appliance that the cloud management system 104 can utilize to build the software appliance. The specification can include any information that the cloud management system 104 needs to build the software appliance such as the name of the software programs included in the software appliance and the minimum resource requirements to support the software programs in the cloud 102. The specification can include other information such as vendor and price so that the cloud management system 104 can perform other processes such as billing the entity or notifying the vendor. The compatibility service 114 can be configured to generate the specification in self-describing language, for example Extensible Mark-Up Language (XML). Once the specification is generated, the compatibility service 114 can be configured to provide the specification to the requesting entity and/or the cloud management system 104.

For example, referring to the FIGS. 4A and 4C, the user 122 can request that the compatibility service 114 design an application server appliance. In response to the request, the compatibility service 114 can search the appliance record 126 and determine that the application server appliance includes the types of software programs: operating system and application server. The compatibility service 114 can search the compatibility record 120 to determine combination of software programs that can be used to design the requested software appliance. For instance, the compatibility service 114 can determine two designs: Appliance 1 including software "1" as the operating system and software "4" as the application server and Appliance 2 including software "2" as the operating system and software "4" as the application server. The compatibility service 114 can then provide a response to the user 122 identifying the two determined designs. The response can also include other information (vendor, price, minimum resource requirements for the cloud 102, etc.) contained in the compatibility record 120 about the software programs included in the determined software appliance designs.

Figure 4D:
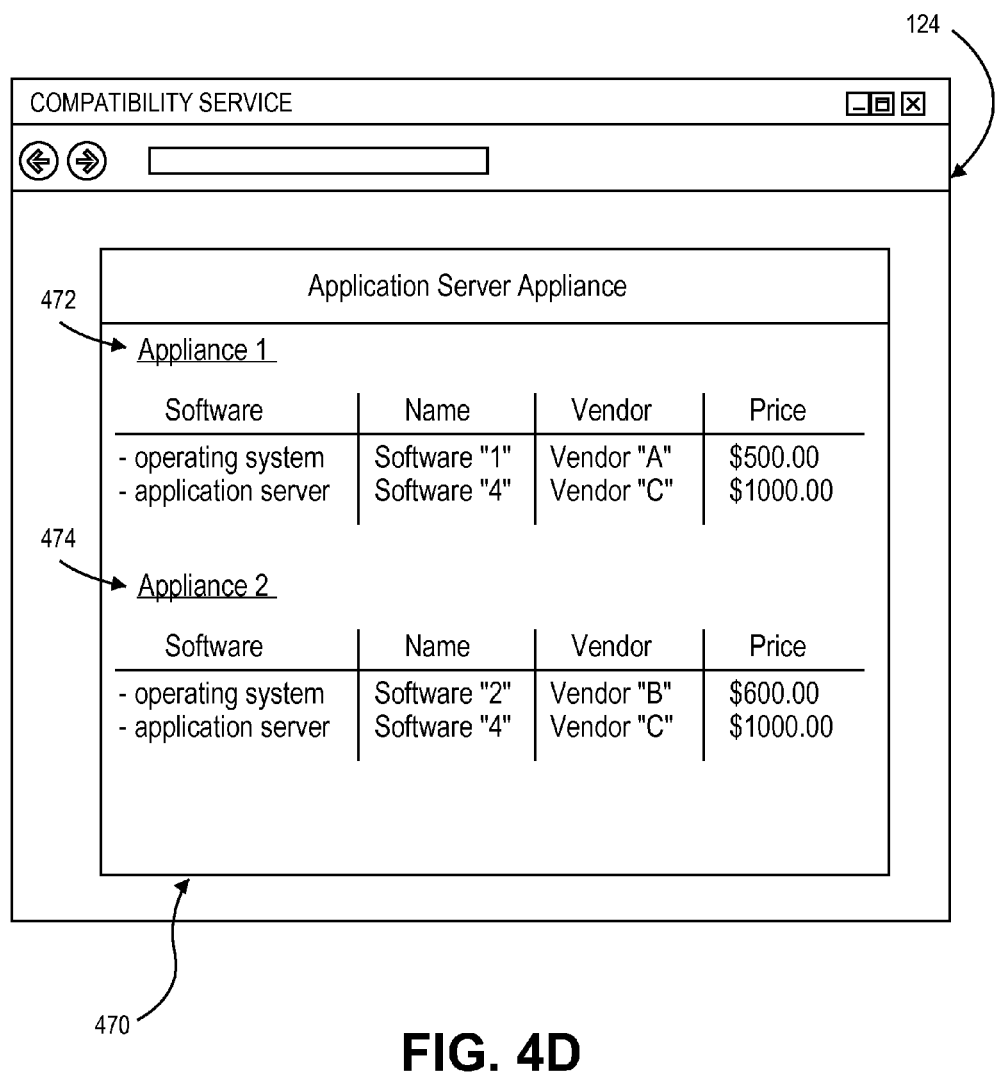
FIG. 4D illustrates an example of a response identifying designs for a software appliance.

FIG. 4D illustrates an example of a response 470 provided in the interface 124. As illustrated, the response 470 can include the two software appliance designs and the software programs contained in the software appliance designs. The response 470 can also include the vendor of the software programs and the price charged by the vendor. Additionally, the response 470 can include links 472 and 474 that generate a request to the compatibility service 114 to generate a specification for the associated appliance design.

As illustrated in FIG. 3, the compatibility service 114 can provide the identification, tracking, and mapping services for the cloud 102. One skilled in the art will realize that the compatibility service 114 can provide the identification, tracking, and mapping services for any cloud that provides software programs from vendors for which the compatibility is stored in the compatibility record 120.

Figure 5:
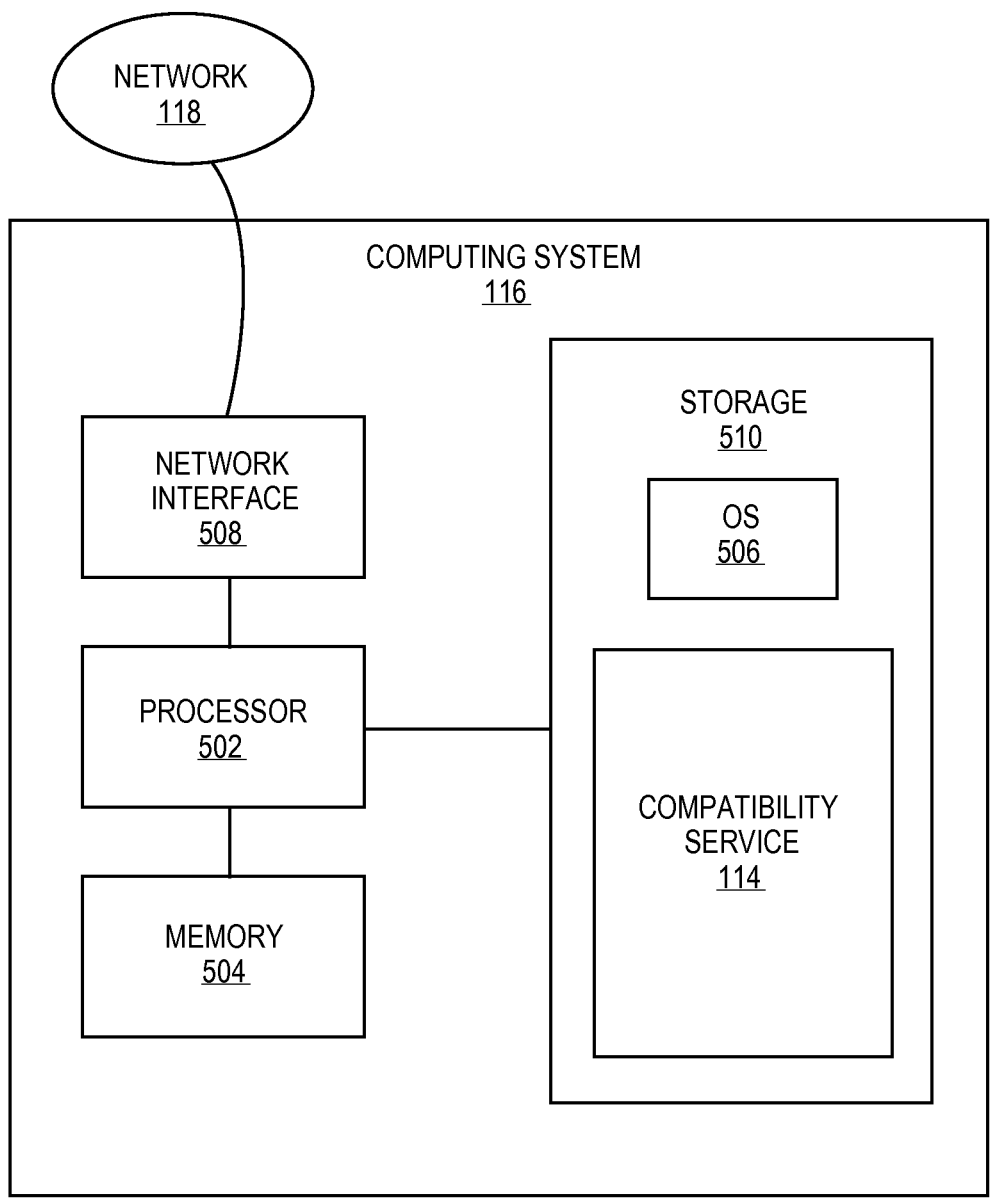
FIG. 5 illustrates an exemplary hardware configuration for a computing system supporting the compatibility service, according to various embodiments.

FIG. 5 illustrates an exemplary diagram of the computing system 116, which can implement the compatibility service 114, and configured to communicate with the one or more networks 118, according to embodiments. In embodiments as shown, the computing system 116 can comprise a processor 502 communicating with a memory 504, such as electronic random access memory, operating under control of or in conjunction with operating system 506. The operating system 506 can be, for example, a distribution of the Linux™ operating system, such as SELinux, the Unix™ operating system, or other open-source or proprietary operating system or platform. The processor 502 also communicates with one or more computer readable storage media or devices 510, such as hard drives, optical storage, and the like, which can store the application program embodiment of the compatibility service 114. The processor 502 further communicates with a network interface 508, such as an Ethernet or wireless data connection, which in turn communicates with one or more networks 118, such as the Internet or other public or private networks.

The processor 502 also communicates with the application program embodiment of the compatibility service 114 to execute control logic and allow for the processes as described above and below. Other configurations of the computing system 116, associated network connections, and other hardware and software resources are possible.

While FIG. 5 illustrates the computing system 116 as a standalone system including a combination of hardware and software, the computing system 116 can include multiple systems operating in cooperation. The application program embodiment of the compatibility service 114 can be implemented as a software application program capable of being executed by the computing system 116, as illustrated, or other conventional computer platforms. Likewise, the compatibility service 114 can also be implemented as a software module or program module capable of being incorporated in other software application programs. In either case, the compatibility service 114 can be implemented in any type of conventional proprietary or open-source computer language. When implemented as a software application program or program code, the compatibility service 114 can be stored in a computer readable storage medium or device, such as storage 510 accessible by the computing system 116. Likewise, during execution, a copy of the compatibility service 114 can be stored in the memory 504.

Figure 6A:
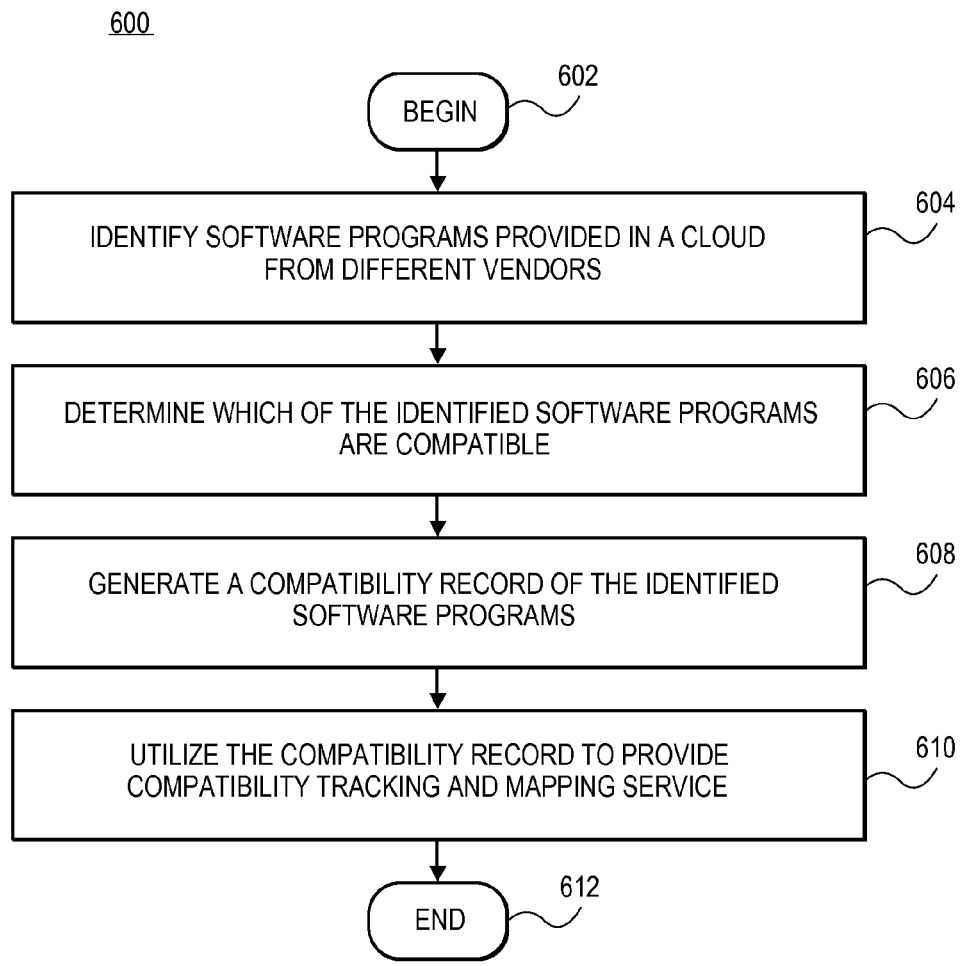
FIG. 6A illustrates a flowchart of an exemplary process for generating a compatibility record, according to various embodiments.

FIG. 6A illustrates a flow diagram of an exemplary process 600 for generating the compatibility record 120 for providing compatibility and mapping services, according to various embodiments. In 602, processing can begin. In 604, the compatibility service 114 can identify software programs provided in the cloud 102 from different vendors. For example, the compatibility service 114 can communicate with the cloud management system 104, the vendor "A" 204, the vendor "B" 208, and/or the vendor "C" 212 to determine the software programs 202, 206, and 210 provided in the cloud 102.

In 606, the compatibility service 114 can determine which of the identified software programs are compatible. For example, the compatibility service 114 can communicate with the cloud management system 104, the vendor "A" 204, the vendor "B" 208, and/or the vendor "C" 212 to determine the compatibility of the software programs 202, 206, and 210.

In 608, the compatibility service 114 can generate a compatibility record 120 of the identified software programs. The compatibility record 120 can include an identification of the identified software programs 202, 206, and 210 (e.g. name, version), a type of the identified software programs 202, 206, and 210 (operating system, application server, etc.), the vendor of the identified software programs 202, 206, and 210, and which of the identified software programs 202, 206, and 210 are compatible. The compatibility record 120 can also store other information such as a minimum amount of cloud resources to instantiate the identified software programs 202, 206, and 210 in the cloud 102 and a price to use the identified software programs 202, 206, and 210 in the cloud 102.

In 610, the compatibility service 114 can utilize the compatibility record 120 to provide compatibility tracking and mapping services. For example, the compatibility service 114 can utilize the compatibility record 120 to identify compatible software programs and the details of the compatible software programs. In 612, the process can end, but the process can return to any point and repeat.

Figure 6B:
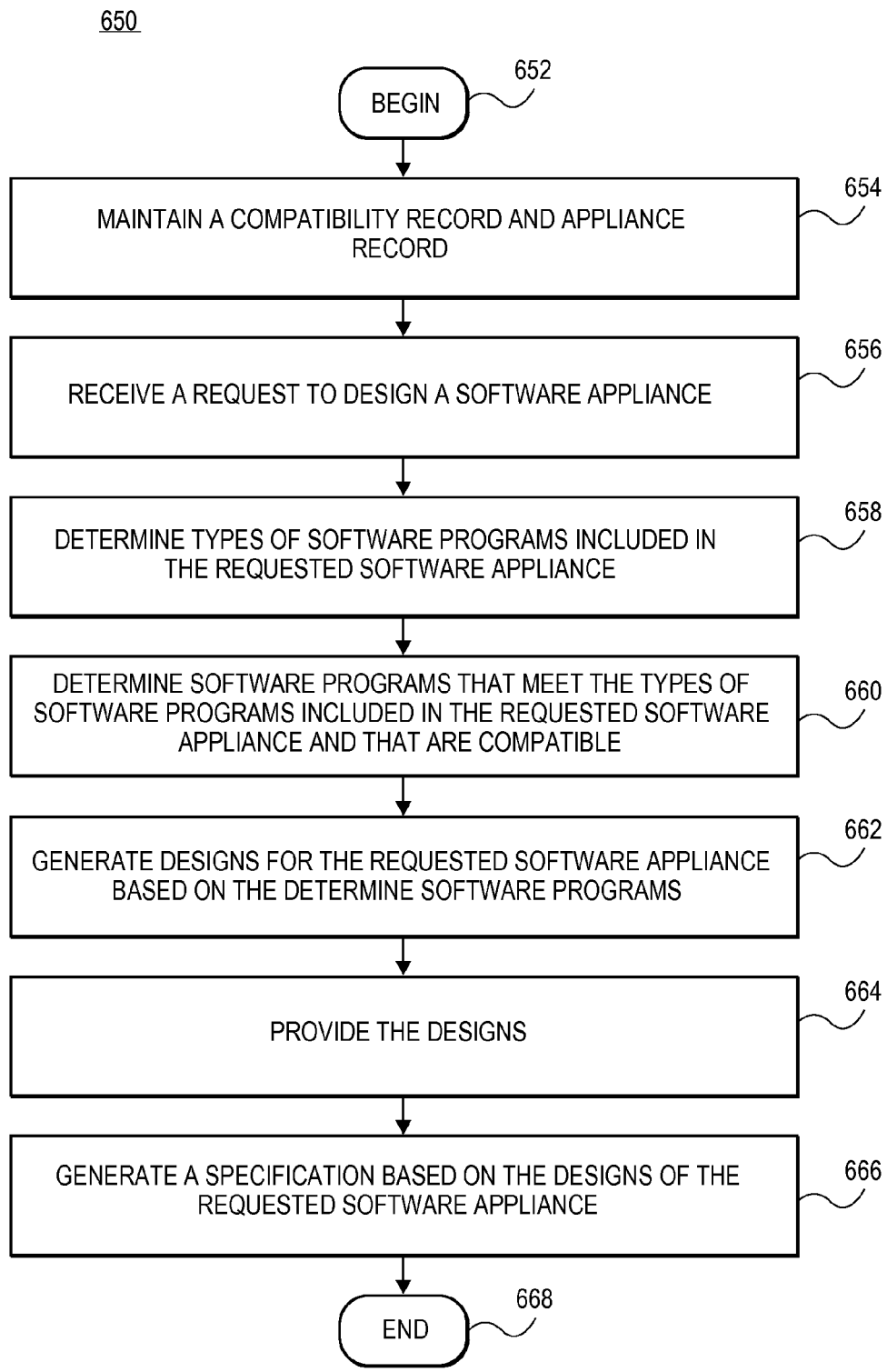
FIG. 6B illustrates a flowchart of an exemplary process for designing a software appliance including compatible software programs, according to various embodiments.

FIG. 6B illustrates a flow diagram of an exemplary process 650 for designing software appliances, according to various embodiments. In 652, processing can begin. In 654, the compatibility service 114 can maintain a compatibility record 120 and an appliance record 126. As described above, the compatibility record 120 can store the compatible software programs 202, 206, and 210 and details about the compatible software programs 202, 206, and 210. The appliance record 126 can store various types of known software appliances (e.g. email server appliance, application server appliance, web server appliance, etc.) and the software programs that are included in the various types of known software appliances.

In 656, the compatibility service 114 can receive a request to design a software appliance. The request can specify a type of software appliance to design. In 658, the compatibility service 114 can determine the types of software programs included in the type of software appliance requested. The compatibility service 114 can search the appliance record 126 to identify the types of software programs that are included in the type of software appliance requested.

In 660, the compatibility service 114 can determine the software programs that meet the types of software programs included in the requested software appliance and that are compatible. The compatibility service 114 can search the compatibility record 120 to identify the software programs 202, 206, and 210 that meet the type of software programs included in the requested software appliance and that are compatible.

In 662, the compatibility service 114 can generate designs for the requested software appliance based on the determined software programs 202, 206, and 210. The designs can include an identification of the software programs 202, 206, and 210 that meet the type of software programs included in the requested software appliance and that are compatible. The designs can also include other information from the compatibility record 120, such as vendor, price, and minimum resources to support the software programs 202, 206, and 210.

In 664, the compatibility service 114 can provide the designs to the requester. For example, the compatibility service 114 can provide the designs to an entity in the cloud computing environment 100 via the one or more networks 118.

In 666, the compatibility service 114 can generate a specification based on the designs of the requested software appliance. For example, the entity can select one of the designs to build a software appliance in the cloud 102, and the compatibility service 114 can generate the specification for the selected design. The specification can include any information that the cloud management system 104 needs to build the software appliance such as the name of the software programs included in the software appliance and the minimum resource requirements to support the software programs in the cloud 102. The specification can include other information such as vendor and price so that the cloud management system 104 can perform other processes such as billing the entity or notifying the vendor. The compatibility service 114 can generate the specification in self-describing language, for example Extensible Mark-Up Language (XML). Once the specification is generated, the compatibility service 114 can provide the specification to the requesting entity and/or the cloud management system 104.

In 668, the process can end, but the process can return to any point and repeat.

Certain embodiments may be performed as a computer application program. The computer application program may exist in a variety of forms both active and inactive. For example, the application program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software application program(s) on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   storing, by a processor in a first record in a computer readable storage medium, data relating to software program compatibility, wherein the software program compatibility is determined in view of at least one of a processing compatibility or a bandwidth compatibility, wherein the first record comprises a first data element identifying a first software program from a first provider in a cloud and a second data element identifying one or more software programs compatible with the first software program, and wherein the one or more software programs comprise a second software program from a second provider, and wherein the second software program is different from the first software program;
   storing, in a second record, data relating to a plurality of software appliances and a plurality of software programs associated with each of the plurality of software appliances;
   receiving a request to design a new software appliance;
   determining alternative sets of software programs that can be used to design the new software appliance in view of the second record;
   generating a plurality of designs of the new software appliance, wherein each design is associated with a set of software programs that are determined compatible in view of the first record;
   presenting, on a graphical user interface, the plurality of designs of the new software appliance; and
   in response to receiving a selection of a design of the plurality of designs of the new software appliance through the graphical user interface, generating a specification for the new software appliance, wherein the specification comprises the set of software programs associated with the selected design.

2. The method of claim 1, the method further comprising:
   determining a third software program from a third provider in the cloud can compatibly share data with the first software program and the second software program;
   storing, in the second data element, an identifier of the third software program indicating compatibility of the third software program with the first software program, wherein the second provider is different from the first provider, and wherein the record is associated with both the first software program and the second software program, wherein the software compatibility further comprises at least one of a memory compatibility or a storage compatibility; and
   storing, in the first record, a third data element, wherein the third data element further comprises at least one of a minimum processing resource required, a minimum memory resource required, a minimum bandwidth resource required, or a minimum storage resource required.

3. The method of claim 1, the method further comprising:
   identifying first cloud resources required to execute the first software program in the cloud;
   identifying second cloud resources required to execute the second software program in the cloud; and
   storing, in the first record, an identifier of the first cloud resources and an identifier of the second cloud resources.

4. The method of claim 1, further comprising:
   identifying the first software program from the first provider in the cloud; and
   receiving an identifier of the first software program from at least one of the first provider or a cloud management system of the cloud.

5. The method of claim 1,
   determining the second software program from that second provider can compatibly share data with the first software program;
   determining the compatibility of the second software program and the first software program in view of usage of the first software program with the second software program in the cloud.

6. The method of claim 1, further comprising:
   providing, to a user, a report of the compatibility between the first software program and the second software program; and
   tracking the compatibility of the first software program in view of the first record.

7. The method of claim 6, wherein the user comprises the first provider, the second provider, or a user of the cloud.

8. The method of claim 6, wherein the report is provided as a service to the user for a fee.

9. A non-transitory computer readable storage medium comprising instructions, that when executed by a processor, cause the processor to:
   store, in a first record, data relating to software program compatibility, wherein the software program compatibility is determined in view of at least one of a processing compatibility or a bandwidth compatibility, wherein the first record comprises a first data element identifying a first software program from a first provider in a cloud and a second data element identifying one or more software programs compatible with the first software program, and wherein the one or more software programs comprise a second software program from a second provider, and wherein the second software program is different from the first software program;
   store, in a second record, data relating to a plurality of software appliances and a plurality of software programs associated with each of the plurality of software appliances;
   receive a request to design a new software appliance;
   determine alternative sets of software programs that can be used to design the new software appliance in view of the second record;
   generate a plurality of designs of the new software appliance, wherein each design is associated with a set of software programs that are determined compatible in view of the first record;
   present, on a graphical user interface, the plurality of designs of the new software appliance; and
   in response to receiving a selection of a design of the plurality of designs of the new software appliance through the graphical user interface, generate a specification for the new software appliance, wherein the specification comprises the set of software programs associated with the selected design.

10. The non-transitory computer readable storage medium of claim 9, wherein the processor is further to:
determine a third software program from a third provider in the cloud can compatibly share data with the first software program and the second software program;
store, in the second data element, an identifier of the third software program indicating compatibility of the third software program with the first software program, wherein the second provider is different from the first provider, and wherein the record is associated with both the first software program and the second software program, and wherein the software compatibility further comprises at least one of a memory compatibility or a storage compatibility; and
store, in the first record, a third data element, wherein the third data element further comprises at least one of a minimum processing resource required, a minimum memory resource required, a minimum bandwidth resource required, or a minimum storage resource required.

11. The non-transitory computer readable storage medium of claim 9, wherein the processor is further to:
identify first cloud resources required to execute the first software program in the cloud;
identify second cloud resources required to execute the second software program in the cloud; and
store, in the first record, an identifier of the first cloud resources and an identifier of the second cloud resources.

12. The non-transitory computer readable storage medium of claim 9, wherein the processor is further to:
provide, to a user, a report of the compatibility between the first software program and the second software program; and
track the compatibility of the first software program in view of the first record.

13. The non-transitory computer readable storage medium of claim 9, wherein the processor is further to:
determine the second software program from that second provider can compatibly share data with the first software program; and
determine the compatibility of the second software program and the first software program in view of usage of the first software program with the second software program in the cloud.

14. A method comprising:
determining, by a processor, a set of software programs in a cloud that can compatibly share data by querying a cloud management system for software program compatibility;
storing, by a processor in a first record in a computer readable storage medium, data relating to the software program compatibility, wherein the software program compatibility is determined in view of at least one of a processing compatibility or a bandwidth compatibility, wherein the first record comprises a first data elements identifying a first software program of the set of software programs and a second data element identifying remaining software programs in the set of software programs as compatible with the first software program;
storing, in a second record, data relating to a plurality of software appliances and a plurality of software programs associated with each of the plurality of software appliances;
receiving a request to design a new software appliance;
determining alternative groups of software programs that can be used to design the new software appliance in view of the second record;
generating a plurality of designs of the new software appliance, wherein each design is associated with a group of software programs that are determined compatible in view of the first record;
presenting, on a graphical user interface, the plurality of designs of the new software appliance; and
in response to receiving a selection of a design of the plurality of designs of the new software appliance through the graphical user interface, generating a specification for the new software appliance, wherein the specification comprises the group of software programs associated with the selected design.

15. The method of claim 14, the method further comprising:
determining cloud resources required to execute, in the cloud, each software program in the set of the software programs; and
storing, in the first record, an identifier of the cloud resources and a third data element, wherein the software compatibility further comprises at least one of a memory compatibility or a storage compatibility, and wherein the third data element further comprises at least one of a minimum processing resource required, a minimum memory resource required, a minimum bandwidth resource required, or a minimum storage resource required.

16. The method of claim 14, wherein identifying the software programs comprises:
receiving an identifier of the software programs from at least one of different providers or the cloud management system of the cloud.

17. The method of claim 14, wherein determining the set of software programs that can compatibly share data, comprises:
determining the set of software programs in view of usage of the set of software programs together in the cloud.

18. The method of claim 14, the method further comprising:
providing, to a user, a report identifying the set of the software programs; and
tracking the compatibility of the set of software programs in view of the first record.

19. The method of claim 18, wherein the user comprises one or more of different providers or a user of the cloud.

20. The method of claim 18, wherein the report is provided as a service to the user for a fee.

21. A non-transitory computer readable storage medium comprising instructions, that when executed by the processor cause the processor to perform operations of claim 14.

* * * * *